United States Patent
Whitman

(10) Patent No.: US 9,868,210 B1
(45) Date of Patent: Jan. 16, 2018

(54) METHODS AND SYSTEMS FOR PLANNING A BODY POSITION OF A ROBOTIC DEVICE

(71) Applicant: Google Inc., Mountain View, CA (US)

(72) Inventor: Eric Whitman, Mountain View, CA (US)

(73) Assignee: Google Inc., Mountain View, CA (US)

(*) Notice: Subject to any disclaimer, the term of this patent is extended or adjusted under 35 U.S.C. 154(b) by 197 days.

(21) Appl. No.: 14/984,177

(22) Filed: Dec. 30, 2015

(51) Int. Cl.
*B25J 9/16* (2006.01)
*B62D 57/032* (2006.01)

(52) U.S. Cl.
CPC .......... *B25J 9/1664* (2013.01); *B25J 9/1697* (2013.01); *B62D 57/032* (2013.01); *Y10S 901/01* (2013.01); *Y10S 901/47* (2013.01)

(58) Field of Classification Search
CPC ... B25J 9/1664; B25J 9/91697; B62D 57/032; Y10S 901/01; Y10S 901/47
See application file for complete search history.

(56) References Cited

U.S. PATENT DOCUMENTS

| | | | |
|---|---|---|---|
| 7,319,919 B2 | 1/2008 | Takenaka et al. | |
| 7,400,939 B2* | 7/2008 | Nagasaka | B62D 57/032 318/568.1 |
| 8,442,687 B2 | 5/2013 | Nagasaka | |
| 8,504,175 B2 | 8/2013 | Pekar et al. | |
| 8,805,584 B2* | 8/2014 | Yamane | B25J 9/1692 700/245 |
| 8,994,312 B2 | 3/2015 | Lee et al. | |
| 9,044,859 B2 | 6/2015 | Cory | |
| 2004/0232632 A1 | 11/2004 | Beck et al. | |
| 2006/0173578 A1* | 8/2006 | Takenaka | B62D 57/032 700/245 |
| 2006/0247800 A1* | 11/2006 | Takenaka | B62D 57/032 700/54 |

* cited by examiner

*Primary Examiner* — Thomas Ingram
(74) *Attorney, Agent, or Firm* — Honigman Miller Schwartz and Cohn LLP

(57) ABSTRACT

Example methods and systems for planning a body position for a robotic device are described. An example method includes receiving a reference step path that defines predetermined step locations for end components of a robotic device. The method also includes receiving a set of constraints, receiving a predetermined height and pitch, and assigning a cost to each of a height of the body, a height acceleration of the body, and a pitch acceleration of the body. The method also includes determining a new height and a new pitch of the body that reduces the height acceleration and the pitch acceleration of the body when the end component moves along the reference step path. Further, the method includes instructing the robotic device to actuate the plurality of appendages to achieve the new height and the new pitch of the body when the end component moves along the reference step path.

20 Claims, 9 Drawing Sheets

METHODS AND SYSTEMS FOR PLANNING A BODY POSITION OF A ROBOTIC DEVICE

BACKGROUND

Unless otherwise indicated herein, the materials described in this section are not prior art to the claims in this application and are not admitted to be prior art by inclusion in this section.

As technology advances, robotic devices are becoming more frequently used in a multitude of different and new capacities. Robotic devices may be used for applications involving material handling, transportation, welding, assembly, and dispensing, among others. Robotic devices that propel their own movement, by stepping, rolling or any other number of means, are required to traverse an increasingly wide range of varied terrains to complete given tasks. As robotic devices are more regularly asked to travel across more diverse topographies, the ability for the robotic device to control its positioning and balance on a terrain is critical. Efficient movement of a robotic device requires a need for more precise and accurate control over the positioning of a body of a robotic device.

SUMMARY

Example embodiments may relate to methods and systems involving planning a position for a body of a robotic device. Further embodiments may relate to methods and systems involving planning a height, a pitch, and/or translational movement of a robotic device. A robotic device may adjust a positioning of the body when the robotic device encounters an obstacle. In some examples, the robotic device may have preferred or desired positioning of the body that may have been predetermined based on a number of factors. Such factors may include a desired height of the body above a surface the robotic device is traversing, a desired pitch of the body, and/or minimizing height and pitch accelerations of the body. By minimizing the height and pitch accelerations of the body, the robotic device may travel across varying terrain with obstacles with improved balance and control resulting in smoother dynamics.

In at least one embodiment, a trajectory of the body, which describes how a position of the body may evolve over a period of time, or a path of the body as a function of time, may be expressed as a high-dimensional vector. The positioning may include a height position, an amount of rotation, and a translational position of the robotic device body. In some examples, the position of the body of the robotic device may include a height, a pitch, a forward position, and lateral position. To determine a trajectory as the robotic device moves across a terrain, a cost function may express a total cost as a function of the high-dimensional vector. Then the cost function may be optimized and the vector, including free variables within the vector, may be solved for and outputted to other systems of the robotic device in order to control the robotic device's movement. Constraints may be utilized that represent physical limits on the robotic device and costs may be assigned on selected parameters expressed in the cost function to weight the importance of the selected parameters. In some examples, this process may lead the robotic device to alter the height and the pitch of the body in order to more successfully navigate across an obstacle. The robotic device may similarly alter the forward and lateral positioning of the body to better navigate a terrain.

In some example embodiments, details of a reference step path, which includes a plurality of spatial points that each define a predetermined step location where the robotic device plans to step as the robotic device moves, is relied on in determining a new height and a new pitch for the body. In some additional examples, additional inputs such as a predetermined desired height, a predetermined desired pitch, allowable accelerations, and/or allowable velocities, may be parameters a computing device relies on in determining a new height and a new pitch for the body.

In one aspect, a method is described. The method includes receiving a reference step path by a computing device. The reference step path is includes at least one spatial point, and each spatial point defines a predetermined step location for an end component of a robotic device. The robotic device has a plurality of appendages that are connected to a body of the robotic device. The end component is connected to a distal end of a given appendage of the plurality of appendages. The method further includes the computing device receiving a set of constraints that comprise a length of the given appendage and a gravitational force experienced by the body of the robotic device. The method may include the computing device receiving a predetermined height and a predetermined pitch of the body for the robotic device to maintain a balance. Also, the method includes the computing device assigning a cost to a height of the body, a height acceleration of the body, and a pitch acceleration of the body. Additionally, the method includes the computing device determining a new height and a new pitch of the body. The new height and new pitch of the body reduce the height acceleration and the pitch acceleration of the body when the end component moves along the reference step path. The determination of the new height and new pitch are based on i) the reference step path, ii) the set of constraints, iii) the predetermined height and the predetermined pitch of the body and iv) the cost assigned to the height of the body, the height acceleration of the body, and the pitch acceleration of the body. The method further includes instructing the robotic device to actuate the plurality of appendages to achieve the new height and the new pitch of the body when the end component moves along the reference step path.

In another aspect, a non-transitory computer readable medium is described. The non-transitory computer readable medium has stored thereon instructions that, upon execution by a computing device, cause the computing device to perform functions. The functions comprise receiving a reference step path. The reference step path includes at least one spatial point, and each spatial point defines a predetermined step location for an end component of a robotic device. The robotic device has a plurality of appendages that are connected to a body of the robotic device. The end component is connected to a distal end of a given appendage of the plurality of appendages. The functions also include receiving a set of constraints that comprise a length of the given appendage and a gravitational force experienced by the body of the robotic device. The functions include receiving a predetermined height and a predetermined pitch of the body for the robotic device to maintain a balance. Furthermore, the functions include assigning a cost to a height of the body, a height acceleration of the body, and a pitch acceleration of the body. The functions also include determining a new height and a new pitch of the body. The new height and the new pitch of the body reduce the height acceleration and the pitch acceleration of the body when the end component moves along the reference step path. The determination of the new height and the new pitch are based on i) the reference step path, ii) the set of constraints, iii) the predetermined height and the predetermined pitch of the body and iv) the costs assigned to the height of the body, the height acceleration of the body, and the pitch acceleration of the body. Further, the functions include instructing the robotic device to actuate the plurality of appendages to achieve the new height and the new pitch of the body when the end component moves along the reference step path.

In still another aspect, a robotic device is provided. The robotic device comprises a body, a plurality of appendages that are each connected to the body of the robotic device, and a plurality of end components that are each connected to a distal end of an appendage of the plurality of appendages. The robotic device further includes a processor and a non-transitory computer readable medium having stored thereon instructions that, when executed by the processor, cause the robotic device to perform functions. The functions performed include receiving a reference step path. The reference step path includes at least one spatial point, and each spatial point defines a predetermined step location for the given end component of the robotic device. The functions also include receiving a set of constraints that comprise a length of the given appendage and a gravitational force experienced by the body of the robotic device. The functions include receiving a predetermined height and a predetermined pitch of the body for the robotic device to maintain a balance. Furthermore, the functions include assigning a cost to a height of the body, a height acceleration of the body, and a pitch acceleration of the body. The functions also include determining a new height and a new pitch of the body. The new height and new pitch of the body reduce the height acceleration and the pitch acceleration of the body when the end component moves along the reference step path. The determination of the new height and the new pitch are based on i) the reference step path, ii) the set of constraints, iii) the predetermined height and the predetermined pitch of the body and iv) the costs assigned to the height of the body, the height acceleration of the body, and the pitch acceleration of the body. Further, the functions include instructing the robotic device to actuate the plurality of appendages to achieve the new height and the new pitch of the body when the end component moves along the reference step path.

These as well as other aspects, advantages, and alternatives will become apparent to those of ordinary skill in the art by reading the following detailed description, with reference where appropriate to the accompanying drawings.

DETAILED DESCRIPTION

Figure 1:
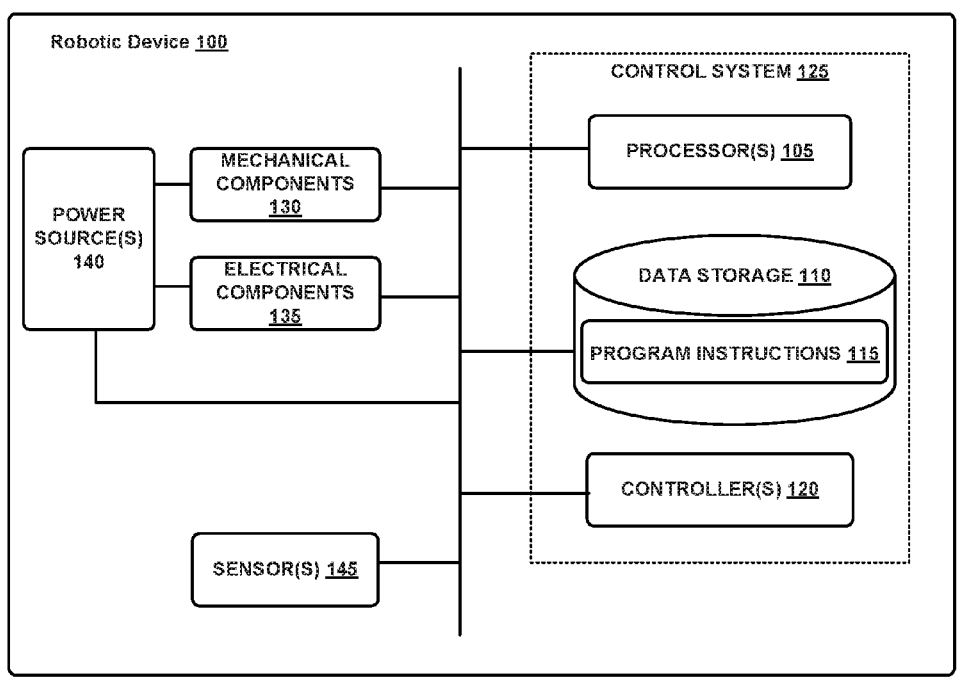
FIG. 1 illustrates a configuration of a robotic device, according to an example implementation.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Robotic devices may take many different configurations and designs depending on the desired utility of the robotic device. Certain robotic devices are designed to traverse varied terrains by utilizing legs for ambulatory robotic devices, wheels or treads for driving robotic devices, or any other number of potential means that may provide the dynamic forces required to put the robotic device in motion. Depending on a number of factors, such as the means of movement, a task assigned to the robotic device, a plan for operating the robotic device, a range of planned or allowable velocities or accelerations of the robotic device, or a positioning of the robotic device within an environment, among other factors, a body of the robotic device (or, robotic device body) may have an ideal, desired or preferred trajectory. A trajectory may include a position of the body, including a height and pitch, as a function of time. Such a trajectory for the body may avoid physical interference between components of the robotic device and the surrounding environment and may enable the robotic device to achieve smooth motion without any abrupt accelerations experienced by the robotic device body. Avoiding or reducing an acceleration on the robotic device body may increase the ability for a user or a computing device to control the robotic device.

In one example embodiment, a trajectory of the body, which describes a height, and/or pitch of the body as a function of time, may be expressed as a high-dimensional vector. Then, to determine a new height and a new pitch of the body that offers better control and/or balance of the robotic device when navigating a terrain, a cost function may be expressed as a function of the vector and the cost function may be optimized to determine a best trajectory by solving for free variables in the vector. By calculating and then transmitting output values for the calculated new height and new pitch of the robotic device body, the robotic device may experience better balance and control so that the robotic device may better traverse slopes, steps, hills, or other obstacles that may be part of the terrain.

The vector may be expressed as a cost function with constraints, the constraints describing physical limitations that are placed on the robotic device and/or components of the robotic device. Costs to features of the trajectory vector, or selected outputs, may be assigned in order to express dynamic preferences for the robotic devices trajectory.

Dynamic preferences may include preferred range of positions, velocities, accelerations, and/or forces that the robotic device may experience as it moves. In some instances, dynamic preferences may include reducing accelerations on the robotic device body, as described above and herein. Optimizing the cost function may include minimizing a total cost subject to the constraints. The constraints may be expressed as linear inequality and equality constraints. In some examples, minimizing the cost function may be done by utilizing quadratic programming.

In some embodiments, costs may be assigned to outputs, including a height of the robotic device body (which in some further embodiments may include a height for each of a plurality of hip heights of the robotic device), a pitch of the body, a height acceleration, a pitch acceleration, a capture point, and a center of pressure, or some combination thereof.

A set of inputs may include a desired height of the body, a desired pitch of the body, the constraints, and the reference step path. The inputs may be considered predetermined as the inputs describe an ideal, desired, or preferred characteristic or parameter that has been provided to the robotic device by a computing device or a user. The reference step path may describe spatial points that each represent a predetermined step location for end components of the robotic device as it moves. Based on the inputs and the minimized cost function subject to the constraints, determining a trajectory for the robotic device body may allow for the robotic device to more smoothly move across a terrain. Determining the trajectory may include determining a new height and new pitch for each time increment within a period of time that allows the body to smoothly transition to the desired height from a current height. For example, determination of a new height and a new pitch of the body may facilitate the robotic device to accomplish an intelligent, logical path of motion across a surface. In another example, as a robotic device approaches a staircase, the robotic device may begin to adjust a height and pitch of a body in order to better facilitate climbing the stairs smoothly without any physical interferences. In yet another example, if the robotic device body has a current height of 0.75 meters and the predetermined desired height while completing a certain task is 0.65 meters, the trajectory determined will provide a smooth transition from the current height to a new height equal to or near the desired height of 0.65 meters over a period of time. Specific embodiments and examples are described in further detail below.

II. EXAMPLE ROBOTIC DEVICES

FIG. 1 illustrates an example configuration of a robotic device 100 that may be used in connection with the implementations described herein. The robotic device 100 may be configured to operate autonomously, semi-autonomously, and/or using directions provided by user(s). The robotic device 100 may be implemented in various forms, such as a biped robotic device, quadruped robotic device, or some other arrangement. Furthermore, the robotic device 100 may also be referred to as a robot, robotic system, mobile robot, or computing device, among other designations.

As shown in FIG. 1, the robotic device 100 may include processor(s) 105, data storage 110, program instructions 115, and controller(s) 120, which together may be part of a control system 125. The robotic device 100 may also include mechanical components 130, electrical components 135, power source(s) 140, and sensor(s) 145. The robotic device 100 is shown for illustrative purposes, and may include more or fewer components. The various components of robotic device 100 may be connected in any manner, including wired or wireless connections. Further, in some examples, components of the robotic device 100 may be distributed among multiple physical entities rather than a single physical entity. For example, robotic device 100 may be configured to receive a laptop, mobile telephone, smartphone, tablet computer, or other computing device to function as control or user-interface components of the robotic device 100. The robotic device 100 may include one or more interfaces that allow connection to and/or communication with various types of other computing devices such as other robotic devices or user-interface devices. Other example illustrations of robotic device 100 may exist as well.

Processor(s) 105 may operate as one or more general-purpose hardware processors or special purpose hardware processors (e.g., digital signal processors, application specific integrated circuits, etc.). The processor(s) 105 may be coupled to data storage 110 and controller(s) 120. The processor(s) 105 may be configured to execute computer-readable program instructions 115 that are stored in data storage 110 and are executable to provide the operations of the robotic device 100 described herein. For instance, the program instructions 115 may be executable to provide functionality of controller(s) 120, where the controller(s) 120 may be configured to cause activation and deactivation of the mechanical components 130 and electrical components 135. Furthermore, the processor(s) 105 may be able to interpret data from sensor(s) 145.

The data storage 110 may exist as various types of storage configured to hold memory. For example, data storage 110 may include or take the form of one or more computer-readable storage media that may be read or accessed by processor(s) 105. The one or more computer-readable storage media may include volatile and/or non-volatile storage components, such as optical, magnetic, organic, or other memory or disc storage, which can be integrated in whole or in part with processor(s) 105. In some implementations, the data storage 110 may be a single physical device. In other implementations, the data storage 110 may be implemented using two or more physical devices, which may communicate with one another via wired or wireless communication. Further, in addition to the computer-readable program instructions 115, the data storage 110 may include additional data such as configuration data, sensor data, and/or diagnostic data, among other possibilities.

Data storage 110 may include computer-readable program instructions 115. Program instructions 115 may include specific functions or tasks for the robotic device 100 to implement. In one instance, program instructions 115 may include instructions about dynamics of the robotic device 100. For example, program instructions 115 may include details about preferred trajectories of mechanical components 130. In another example, program instructions 115 may include details about a preferred, desired or predetermined position for the mechanical components 130; the preferred, desired or predetermined position of the mechanical components 130 may be based on the requirements of a certain task undertaken by the robotic device 100. Computer-readable program instructions 115 may also include data for instructions about the robotic device 100 interacting and moving around an environment.

Robotic device 100 may be configured to operate according to a robotic device operating system (e.g., an operating system designed for specific functions of the robotic device) that may be stored in data storage 110 or as computer-readable program instructions 115. A robotic device operating system may provide libraries and tools to enable robotic device applications. Examples of robotic device operating systems include open source software such as ROS (robot operating system), DROS, or ARCOS (advanced robotics control operating system). A robotic device operating system may include publish and subscribe functionality, and may also include functionality to control components of the robotic device, such as head tracking, base movement (e.g. velocity control, navigation framework), etc.

The robotic device 100 may include controller(s) 120, which may interface with the robotic device 100. The controller(s) 120 may include one or more electrical circuits, units of digital logic, computer chips, and/or microprocessors that are configured to (perhaps among other tasks), interface between any combination of the mechanical components 130, the electrical components 135, the power source(s) 140, the sensor(s) 145, and/or a user of the robotic device 100. In some instances, the controller(s) 120 may serve as an interface between the robotic device 100 and another computing device. In some implementations, the controller(s) 120 may be a purpose-built embedded device for performing specific operations with one or more subsystems of the robotic device 100. The example interfaces and communications noted may be implemented via a wired or wireless connection, or both. The controller(s) 120 may perform other functions for the robotic device 100 as well.

The control system 125 may include the processor(s) 105, the data storage 110, computer-readable program instructions 115, and controller(s) 120. The control system may also include and/or communicate with other systems of the robotic device 100. Operations of the control system 125 may be carried out by the processor(s) 105. Alternatively, the controller(s) 120 may carry out those operations. In some implementations, the control system 125 may partially or wholly reside on a device other than the robotic device 100, and therefore may at least in part control the robotic device 100 remotely.

The control system 125 may monitor and physically change the operating conditions of the robotic device 100. In doing so, the control system 125 may serve as a link between portions of the robotic device 100, such as between mechanical components 130, electrical components 135, and/or sensor(s) 145. In some instances, the control system 125 may serve as an interface between the robotic device 100 and another computing device. Also, the control system 125 may serve as an interface between robotic device 100 and a user. The control system 125 may include various components for communicating with the robotic device 100, including, for example, a touchscreen, a joystick, buttons, and/or ports, etc. The example interfaces and communications noted above may be implemented via a wired or wireless connection or both. The control system 125 may perform other operations for the robotic device 100 as well.

The control system 125 may include or communicate with other systems of the robotic device 100 via wired or wireless connections, and may further be configured to communicate with user(s) of the robotic device 100 and/or other computing devices. In some implementations, control system 125 may receive data and information from other systems that may be part of the robotic device 100 or may be external to robotic device 100. Such data and information may include the status of the mechanical components 130, electrical components 135, power source(s) 140, and the sensor(s) 145. In one possible illustration, control system 125 may receive input data and/or information from a user, from another robotic device, or from another system among other possibilities. Input data may include a physical location, a velocity, or an acceleration of a robotic device or its components.

For example in one instance, control system 125 may receive data about a reference step path for a legged robotic device. In another illustration, control system 125 may receive data about a height above a surface, a height acceleration, a pitch acceleration, a center of pressure and a capture point of a robotic device. In another illustration, control system 125 may receive data that indicates a force experienced by a mechanical component (such as a leg, wheel, or other component) from the robotic device's 100 environment. The data may come from sensor(s) 145.

In another illustration, other systems such as a robotic gait system may be configured to communicate with the control system 125. A gait is a pattern of movement of the limbs of an animal, robotic device, or other mechanical structure. The robotic gait system may determine and provide a reference step path for a legged robotic device. The reference step path may include details about a predetermined step location for an end component of a robotic device. The details from the robotic gait system about the predetermined step location may include a x-coordinate, a y-coordinate, and/or a z-coordinate.

In another instance, the control system 125 may be configured to include or communicate with a robotic vision system. The robotic vision system may include sensor(s) 145. In one instance, the robotic vision system may include a processor and a camera feed from a field of view of a robotic device. The robotic vision system may determine and provide a reference step path for a legged robotic device. The reference step path may include details about a predetermined step location for an end component of a robotic device. The details from the robotic vision system about the predetermined touchdown location may include a x-coordinate, a y-coordinate, and/or a z-coordinate.

In still another illustration, the control system 125 may receive a reference step path from a combination of systems that may include the robotic gait system and robotic vision system. For example, the robotic gait system may provide a x-coordinate and y-coordinate for a predetermined step location of the reference step path based on input data and data from sensor(s) 145 while the robotic vision system may provide a z-coordinate for the predetermined step location of the reference step path based on data from sensor(s) 145.

The controller(s) 120 and/or the control system 125 may be custom designed for a specific robotic device 100 or to achieve a certain task or goal. In one example, the controller(s) 120 and/or the control system 125 may take the form of a Model Predictive Controller (MPC). A MPC may plan the movement of the robotic device 100 over a time horizon by solving an optimization problem over that horizon. The MPC may utilize feedback data from a previous time increment as input and by iterating the solving the optimization problem for each time period the MPC may provide the plan for dynamic movement of the robotic device 100.

In one instance applying a MPC, the state of the robotic device 100 may be measured or inputted, then an optimization of a state-dependent cost function may be determined for a certain time horizon, then the robotic device 100 may apply the optimization and repeat the process for a future time horizon. Furthermore, using the MPC may include estimating a state of a future position of the robotic device 100 and using data from that state as an input. The stated time horizon may be a variety of time values. In some examples, the time horizon that the MPC would iterate at may be 30 milliseconds, 60 milliseconds, or 100 milliseconds. The cost function may be subject to certain constraints placed on the system. The constraints may be physical constraints or constraints inputted by a user to achieve a predetermined position of the robotic device 100. The position may include a height and a pitch of a body of the robotic device 100. The MPC may also be referred to as Receding Horizon Control (RHC); the RHC would operate similarly to the MPC. In one implementation, rather than using an output data from the MPC directly in an iteration, the output data may be used to create a desired state to produce an intermediate desired state to advance the robotic device 100 in time.

Mechanical components 130 represent possible hardware of the robotic device 100 that may enable the robotic device 100 to operate and perform physical operations. As a few examples, the robotic device 100 may include actuator(s), appendage(s), end component(s), leg(s), arm(s), foot (feet), wheel(s), one or more structured bodies for housing the computing system or other components ("body," "robotic device body" or "robot body"), physical members and other mechanical components. The actuator(s) may be arranged to move the mechanical components in relation to one another.

The mechanical components 130 may depend on the design of the robotic device 100 and may also be based on the functions and/or tasks the robotic device 100 may be configured to perform. As such, depending on the operation and functions of the robotic device 100, difference mechanical components 130 may be available for the robotic device 100 to utilize. As mechanical components 130 actuate, rotate, slide, or move in another manner, the mechanical components 130 may interact with each other and/or the surrounding environment to cause the robotic device 100 to move. In such an instance, controlling a position of the mechanical components 130, including the robotic device body, may be important to the functions and/or tasks the robotic device 100 may be configured to perform.

In some examples, the robotic device 100 may be configured to add and/or remove mechanical components 130, which may involve assistance from a user and/or other robotic device. For example, the robotic device 100 may be configured with removable arms, hands, feet, and/or legs, so that these appendages can be replaced or changed as needed or desired. In some implementations, the robotic device 100 may include one or more removable and/or replaceable battery units or sensors. Other examples of mechanical components may be included within some implementations.

The electrical components 135 may include various mechanisms capable of processing, transferring, and/or providing electrical charge or electrical signals. Among possible examples, the electrical components 135 may include electrical wires, circuitry, and/or wireless communication transmitters and receivers to enable operations of the robotic device 100. The electrical components 135 may interwork with the mechanical components 130 to enable the robotic device 100 to perform various operations. For example, the electrical components 135 may be configured to provide power from the power source(s) 140 to the various mechanical components 130. Further, the robotic device 100 may include electric motors. Other examples of electrical components 135 may exist as well.

The robotic device 100 may also include one or more power source(s) 140 configured to supply power to various components of the robotic device 100. Among other possible power systems, the robotic device 100 may include a hydraulic system, electrical system, batteries and/or other types of power systems. As an example illustration, the robotic device 100 may include one or more batteries configured to provide charge to components of the robotic device 100. Some of the mechanical components 130 and/or electrical components 135 may each connect to a different power source, may be powered by the same power source, or be powered by multiple power sources.

Any type of power source(s) 140 may be used to power the robotic device 100, such as electrical power, solar power or a gasoline engine. Additionally or alternatively, the robotic device 100 may include a hydraulic system configured to provide power to the mechanical components 130 using fluid power. For example, components of the robotic device 100 may operate based on hydraulic fluid being transmitted throughout the hydraulic system to various hydraulic motors and hydraulic cylinders. The hydraulic system may transfer hydraulic power by way of pressurized hydraulic fluid through tubes, flexible hoses, or other links between components of the robotic device 100. The power source(s) 140 may charge using various types of charging, such as wired connections to an outside power source, wireless charging, combustion, or other examples.

The robotic device 100 may include sensor(s) 145 arranged to sense various aspects of the robotic device 100. The sensor(s) 145 may include one or more force sensors, torque sensors, velocity sensors, acceleration sensors, position sensors, proximity sensors, motion sensors, location sensors, load sensors, temperature sensors, balance sensors, angle sensors, touch sensors, depth sensors, ultrasonic range sensors, infrared sensors, object sensors, and/or cameras, among other possibilities. In some examples, the robotic device 100 may be configured to receive sensor data from sensors that are physically separated from the robotic device (e.g., sensors that are positioned on other robotic devices, other computing devices or located within the environment in which the robotic device is operating). In some examples, robotic device 100 may be configured to make determinations about the state of components of robotic device 100 based on data from sensor(s) 145.

The sensor(s) 145 may provide sensor data to the processor(s) 105 to allow for interaction of the robotic device 100 with its environment, as well as monitoring of the operation of the robotic device 100. The sensor data may be used in evaluation of various factors for activation, movement, and deactivation of mechanical components 130 and electrical components 135 by control system 125. For example, the sensor(s) 145 may capture data corresponding to the terrain of the environment or location of nearby objects, which may assist with environment recognition and navigation. In one illustration, the data captured by the sensor(s) 145 that corresponds to the terrain or environment surrounding a robotic device may be used to determine a reference step path, specifically a x-coordinate, a y-coordinate, and/or a z-coordinate of a predetermined step location of a mechanical component 130.

In an example configuration, sensor(s) 145 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic device 100 is operating. The sensor(s) 145 may monitor the environment in real time, and detect obstacles, elements of the terrain, weather conditions, temperature, and/or other aspects of the environment.

Further, the robotic device 100 may include sensor(s) 145 configured to receive information indicative of the state of the robotic device 100, including sensor(s) 145 that may monitor the state of the various components of the robotic device 100. The sensor(s) 145 may measure activity of systems of the robotic device 100 and receive information based on the operation of the various features of the robotic device 100, such the operation of extendable legs, arms, or other mechanical and/or electrical features of the robotic device 100. The data provided by the sensor(s) 145 may enable the control system 125 to determine errors in operation as well as monitor overall operation of components of the robotic device 100. In another example, sensor(s) 145 may be configured to determine a height of a robotic device above a surface. In another example, sensor(s) 145 may be configured to determine a pitch of a body of a robotic device.

As an example, the robotic device 100 may use force sensors to measure load on various components of the robotic device 100. In some implementations, the robotic device 100 may include one or more force sensors on an appendage such as an arm or a leg to measure the load on the actuators that move one or more members of the appendage. As another example, the robotic device 100 may use one or more position sensors to sense the position of the actuators of the robotic device 100. For instance, such position sensors may sense states of extension, retraction, or rotation of the actuators on appendages.

As another example, the sensor(s) 145 may include one or more velocity and/or acceleration sensors. For instance, the sensor(s) 145 may include an inertial measurement unit (IMU). The IMU may sense velocity and acceleration in the world frame, with respect to the gravity vector. The velocity and acceleration sensed by the IMU may then be translated to that of the robotic device 100 based on the location of the IMU in the robotic device 100 and the kinematics of the robotic device 100.

The robotic device 100 may include other types of sensors not explicated discussed herein. Additionally or alternatively, the robotic device 100 may use particular sensors for purposes not enumerated herein.

Figure 2:
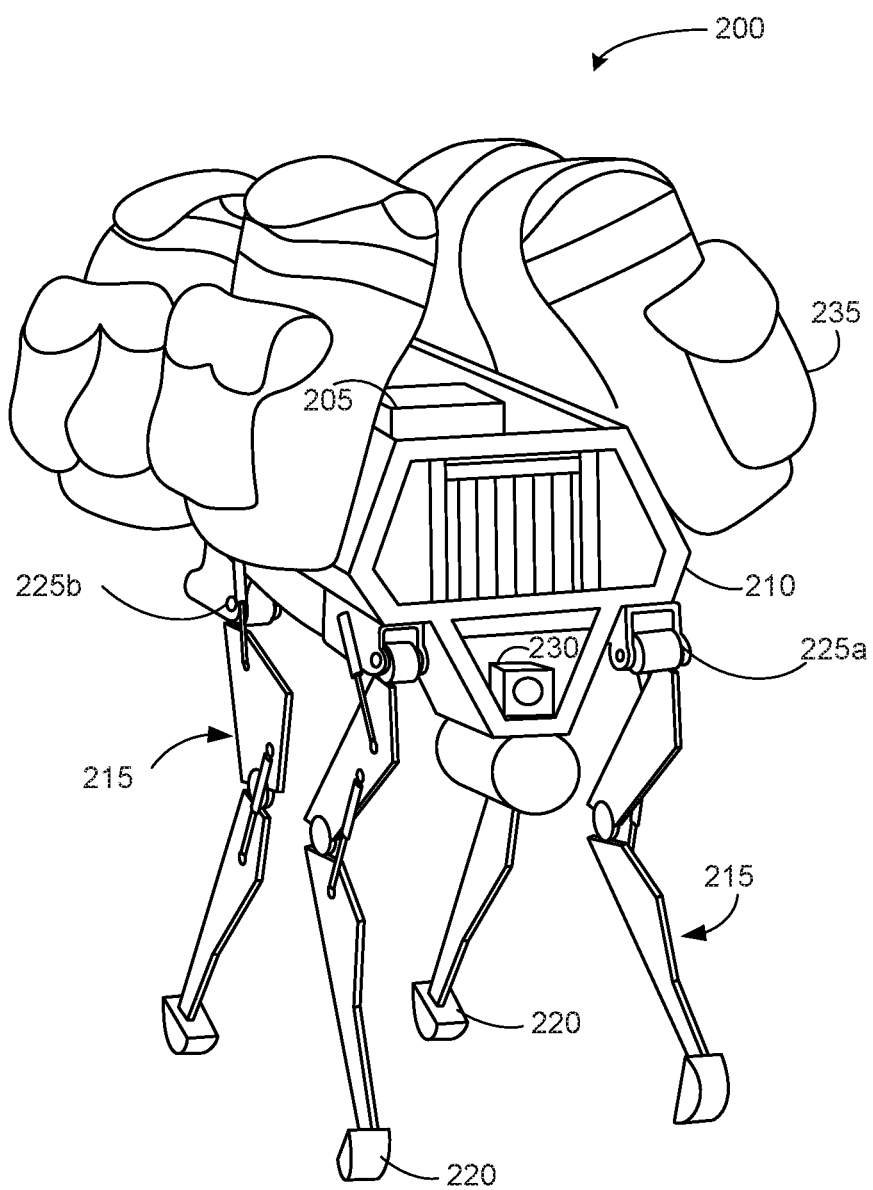
FIG. 2 illustrates a quadruped robotic device, according to an example implementation.

FIG. 2 illustrates a quadruped robotic device 200, according to an example implementation. Among other possible features, the robotic device 200 may be configured to perform some of the operations described herein. The robotic device 200 includes a control system 205, a robotic device body 210 ("the body 210"), robotic device appendage(s) 215 connected to the robotic device body 210, robotic device end component(s) 220 connected to the distal end of the robotic device appendage(s) 215, and hip joint(s) 225 at the connection point between the robotic device appendage(s) 215 and the robotic device body 210. Further, the robotic device 200 is illustrated with sensor(s) 230 and may be capable of carrying a load 235 on the robotic device body 210. In other instances, the robotic device may include more or fewer components, and thus may include components not shown in FIG. 2.

Robotic device 200 may be a physical representation of the robotic device 100 shown in FIG. 1, or may be based on other configurations. Thus, the robotic device 200 may include one or more of the control system 125, mechanical components 130, electrical components 135, power source(s) 140, and/or sensor(s) 145, among other possible components or systems.

To operate, the robotic device 200 includes a computing system that may be made up of one or more computing devices configured to assist in various operations of the robotic device 200, which may include receiving and processing data and providing outputs based on the data. The computing system may process information provided by various systems of the robotic device 200 (e.g., a sensor system) or from other sources (e.g., a user, another robotic device, a server) and may provide instructions to the systems to operate in response.

In one instance, the computing system may monitor systems of the robotic device 200 during operation in order to determine errors and/or monitor regular operation. In some example configurations, the computing system may serve as a connection between the various systems of the robotic device 200 that coordinates the operations of the systems together to enable the robotic device 200 to perform functions. Further, although the operations described herein correspond to a computing system of a robotic device performing tasks, the computing system may include multiple devices, processors, controllers, and/or other entities configured to assist in the operation of the robotic device. The computing system may operate using various types of memory and/or other components.

The robotic device 200 may include a control system 205. Control system 205 may be similar to control system 125 of FIG. 1 and may be configured to be the computing system described above. As shown in FIG. 2, control system 205 may be housed within robotic device body 210. In other examples, control system 205 may be located away from robotic device 200 and communicate wirelessly with systems onboard robotic device 200. Control system 205 may include multiple components such as processor(s) 105, data storage 110, and controller(s) 120.

The robotic device 200 may include the robotic device body 210, which may connect to or house appendages and/or other components of the robotic device 100. As shown in FIG. 2, the body 210 houses control system 205 and sensor(s) 230 and the body 210 is connected to four hip joints (225) which in turn connects to four appendages 215 and four end components 220. The designed structure of the body 210 may vary with examples and may further depend on particular operations that a given robotic device may be designed to perform. For example, if the robotic device 200 is designed to carry heavy loads then the body 210 may be designed larger and/or wider to accommodate the heavy load. In another example, if robotic device 200 is designed to travel at high speeds then the body 210 may be designed to be lighter to better facilitate the travel at high speeds. The body 210 may be developed using various types of materials, such as metals and plastics.

In some instances, a positioning of the robotic device body 210 may be important. In some examples, the body 210 may have a predetermined height and/or a predetermined pitch relative to a surface below the body 210 to enable efficient movement of the robotic device 200 across a surface or a terrain. The predetermined height and/or pitch of the body 210 may be planned as part of a set of instructions or commands received by the robotic device 200 or the control system 205. In some instances, the body 210 may have a height above a surface and a pitch that equal the predetermined height and the predetermined pitch. In some other instances, the body 210 may have a height above a surface and a pitch that do not equal the predetermined height and the predetermined pitch. For example, the body 210 may have a predetermined height and a predetermined pitch that are preferred for a certain type of movement. In some instances, the predetermined height and predetermined pitch may not be achieved because of some other requirement on the robotic device 200. The height and pitch of the body 210 may not equal the predetermined height and predetermined pitch in such an instance, but may be nearly or closely to being equal.

The robotic device body 210 may also have a height acceleration and/or a pitch acceleration when the robotic device 200 is moving around a terrain. In some examples, the height and/or pitch acceleration may be monitored and controlled by the control system 205. Control system 205 may utilize one or more sensor(s) 230 in order to monitor and/or control a height, a pitch, the height acceleration, and the pitch acceleration. In some examples, the control system 205 may attempt to reduce and/or minimize the height and/or pitch acceleration. By reducing or minimizing the height and/or pitch acceleration of the body 210, the robotic device 200 may be able to accomplish other operations more efficiently or smoothly.

Robotic device 200 may have a variety of appendage(s) 215 attached to the robotic device 200 that may aid in varying robotic device operations. The appendage(s) 215 may be configured as legs, arms, wheels, etc. or some combination thereof. The robotic device 200 in FIG. 2 is shown with four appendages 215 configured as legs that enable the robotic device 200 to move about its environment. Although the illustration of FIG. 2 shows four appendages 215, the robotic device 200 may include more or less appendages of similar or different configurations within other examples. The appendage(s) 215 may vary in example implementations in configuration, position, and/or structure, depending on the operational tasks the robotic device 200 is designed to accomplish. The appendage(s) 215 enable the robotic device 200 to move about and interact with an environment.

The appendage(s) 215 may have a fixed length, extendable length, or other configuration and may operate with one or more degrees of freedom. The appendage(s) 215 may include one or more joints that allow for movement of different components of the appendage(s) 215. The appendage(s) 215 may be configured to enable different techniques of travel and may further enable the robotic device 200 to travel at various speeds and/or trajectories.

The robotic device 200 may have an end component(s) 220 coupled to the given appendage(s) 215. In some examples, appendage(s) 215 may have one or more end component 220 attached to it. As shown in FIG. 2, in some examples, the end component(s) 220 attach to a distal end of the appendage(s) 215; the distal end of the appendage(s) being the end of the appendage(s) 215 that is the end not coupled to a hip joint 225 and/or the robotic device body 210. The end component(s) 220 may be configured as feet, hands, end effectors, etc. In some examples, the end component(s) 220 operate as a tool the robotic device 200 uses to manipulate the environment surrounding the robotic device 200. In some examples, the end component(s) 220 enable the robotic device 200 to move and/or manipulate the robotic device 200 around the surrounding environment. As illustrated in FIG. 2, the end component(s) 220 may be configured to make contact with a surface (e.g., a ground surface). In some examples, the robotic device 200 may move the end component(s) 220 to predetermined step location(s) of a reference step path on a surface by actuating the appendage(s) 215 in order to exert a force on the surface. By exerting a force on the surface, the robotic device 200 may be able to travel about an environment by walking, jogging, trotting, running, or other gait or any combination thereof.

The robotic device 200 may also have a hip joint(s) 225 at a connection point between the appendage(s) 215 and the robotic device body 210. In some examples, the hip joint(s) 225, attached to appendage(s) 215, may allow for one or more degrees of freedom and may aid robotic device 200 in moving around the surrounding environment. As illustrated in FIG. 2, there may be two front hip joints 225a and two hind hip joints 225b. The front hip joints 225a may be located near a front of the body 210 while the hind hip joints 225b may be located near a rear of the body 210. The combination of hip joint(s) 225, appendage(s) 215, and end component(s) 220 may enable the robotic device 200 to travel across various terrains. Other examples may include more or less components in order to facilitate the robotic device 200 to move around and/or traverse across an environment.

The robotic device 200 may also include sensor(s) 230 configured to provide sensor data to the control system 205. Sensor(s) 230 may correspond to sensor(s) 145 of FIG. 1. As shown in FIG. 2, the sensor(s) 230 may include a camera or sensing system positioned on the front of the body 210. In other examples, the sensor(s) 230 may include a variety of other types of sensors and be placed at other positions of the robotic device 200. In one instance, sensor(s) 230 may be configured as part of the robotic vision system, and the robotic vision system may include a processor and a camera feed from a field of view of a robotic device. The robotic vision system and or sensor(s) 230 may determine and provide a reference step path for the end component(s) 220 for a robotic device 200. In some examples, the sensor(s) 230 may be configured to provide feedback to control system 205, the feedback including data about height, pitch, forward positioning, lateral positioning, height acceleration, pitch acceleration of the body 210 or other components of robotic device 200.

The robotic device 200 may carry a load 235 on the body 210. In some examples, load 235 may be a type of cargo that is to be transported, or may be external batteries or power sources (e.g., solar panels) that robotic device 200 may utilize.

Figure 3:
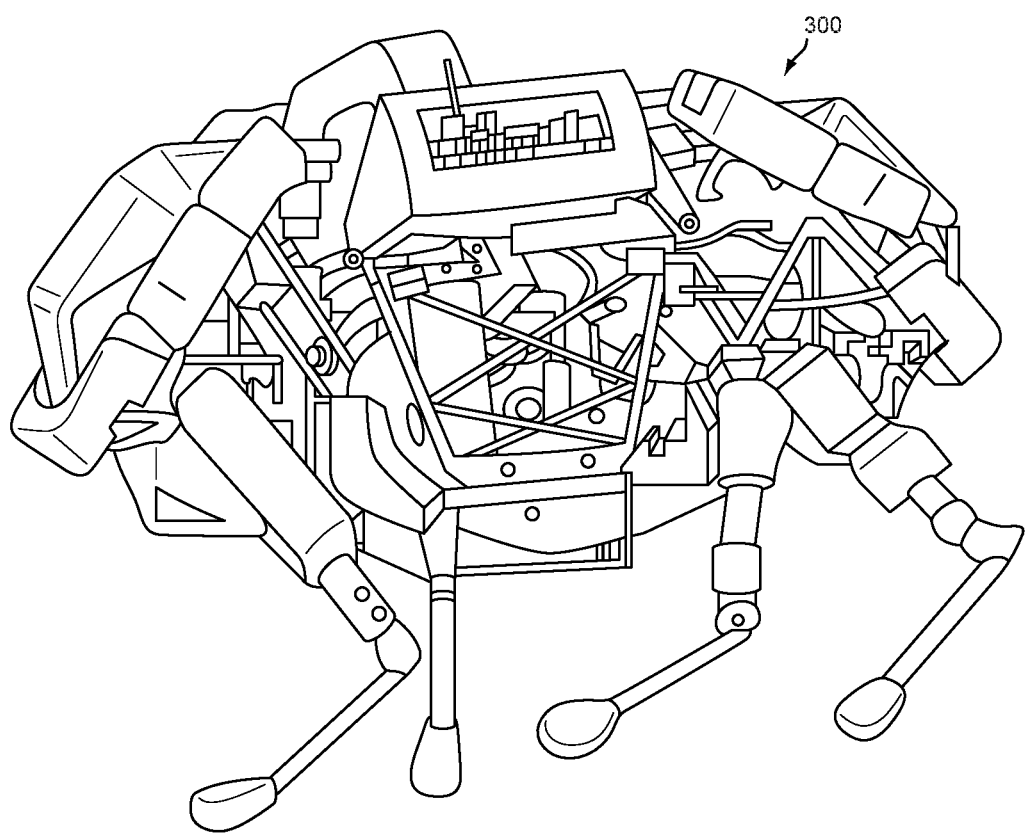
FIG. 3 illustrates another quadruped robotic device, according to an example implementation.

FIG. 3 is another illustration of a robotic device 300 that, like robotic device 200, may be a physical representation of the robotic device 100 shown in FIG. 1, or may be based on other configurations. Thus, the robotic device 300 may include one or more of the control system 125, mechanical components 130, electrical components 135, power source(s) 140, and/or sensor(s) 145, among other possible components or systems.

III. EXAMPLE POSITIONING OF A BODY OF A ROBOTIC DEVICE

Figure 4:
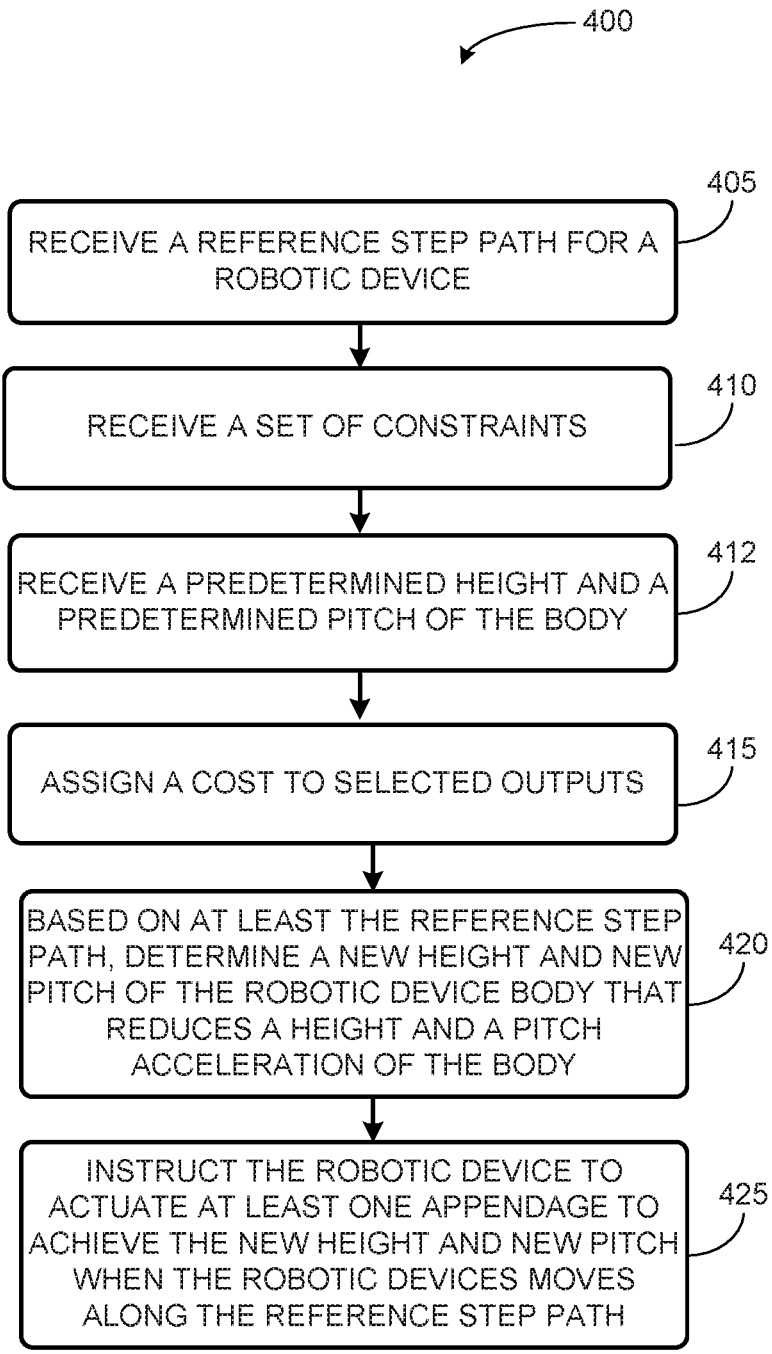
FIG. 4 is a flowchart illustrating example functional aspects, according to an example implementation.

FIG. 4 is a flowchart of an example method for determining a height and a pitch of a body of a robotic device ("the body" or "the robotic device body"), in accordance with at least some embodiments described herein. In one example implementation, method 400 describes determining a new height and new pitch of the body by expressing a trajectory of the body as a high-dimensional vector, expressing a cost function as a function of that vector, and then optimizing the function to determine the best trajectory by solving for free variables in the vector. Costs may be assigned to potential outputs in order to weight the importance of those outputs depending on the desired behavior characteristics of the robotic device.

For example, the robotic device may be described by a linear system $Ax=b$, where A is a constant matrix, x represents the high-dimensional vector of free variables, and b is a vector of constants. Each row of the linear system is a linear equation that represents a desired behavior characteristic for the robotic device. So for example, if an acceleration at a particular time is desired to be zero, that might be represented in one of the rows of the system. Or similarly, another row might describe a characteristic such as a height of the body at a particular time being equal to a desired height. To assign a cost, each linear equation may be multiplied by a constant weight that represents the importance of that row in relation to the other rows. In one embodiment, the linear system may include more equations than can simultaneously be satisfied, and therefore may be considered an over-constrained system. In order to solve for the free variables, the computing device may utilize quadratic programming to optimize the cost function. The cost function, where x represents the trajectory vector, may be expressed as $C(x)=\frac{1}{2}x^T Qx+q_0 x$. $Q$ and $q_0$ may be constructed from $Ax=b$, where $Q=A^T A$ and and $q_0=-b^T A$. The quadratic programming may include using a Model Predictive Controller or Receding Horizon Control to re-optimize the trajectory for multiple time iterations.

The trajectory vector may represent the positions of the body over a time period. The free variables, represented in the trajectory vector and solved for by the quadratic programming, may include a height of the body and a pitch of the body at a given time. So for each time increment, the height and pitch of the body may define the position of the body. In one embodiment, the trajectory vector, now solved by the quadratic programming, may then be used to compute a velocity, accelerations, and a height of hips of the robotic device. A capture point may then be computed from trajectory vector and the computed velocity. A center of pressure may then be computed from the computed accelerations using inverse dynamics. More examples and details, including details about example computations, are described below in blocks 415 and 420.

In some embodiments, the trajectory may be defined more simply as a height and a pitch of the body as a function of time. Method 400 may include one or more operations, functions, or actions as illustrated by one or more blocks of 405-425. Although the blocks are illustrated in sequential order, these blocks may in some instances be performed in parallel, and/or in a different order than those described herein. Also, the various blocks may be combined into fewer blocks, divided into additional blocks, and/or removed based upon desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, a storage device include a disk or hard drive. The computer readable medium may include a non-transitory computer readable medium, such as computer readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

Illustrative methods, such as method 400, may be carried out in whole or in part by a component(s) in a robotic device, such as one or more of the components in the robotic device 100 illustrated in FIG. 1, by a component(s) in robotic device 200 as illustrated in FIG. 2, or by a component(s) in robotic device 300 as illustrated in FIG. 3. It should be understood that example methods, such as method 400, might be carried out by entities, or combinations of entities (i.e., by other computing devices, robotic devices, and/or combinations thereof), without departing from the scope of the invention.

For example, functions of the method 400 may be fully performed by a computing device (or components of a computing device such as one or more processors or controllers), or may be distributed across multiple components of the computing device, across multiple computing devices, and/or across a server. In some examples, the computing device may receive information from sensors of the computing device, or may receive information from other computing devices that collect the information. As with other examples, a computing device, a server, or a robotic device may perform the method 400.

As shown by block 405, the method 400 includes receiving information that indicates a reference step path for a robotic device. The reference step path may include a plurality of spatial points that each define a predetermined step location for an end component of a robotic device. In some instances, the reference step path may represent the planned location of one or more locations for the robotic device to step or make contact between the surface and the end component while the robotic device is walking, trotting, jogging, running, or executing some other type of movement. A desired reference step path may represent a series of desired step locations for a robotic device. In some embodiments, the series of desired step locations may include a step location for each end component for a specific time period, such as one second. The plurality of spatial points, each of which represent a predetermined step location, may include a x-coordinate, a y-coordinate, and a z-coordinate that define a unique location, possibly on a surface within an environment or terrain. In some examples, the information received may include details for one or more reference step paths.

The information may be received by a computing device from a robotic device that has been programmed or requested to perform a task. In other examples, the information may be received by a server in communication with the robotic device or with a computing device that controls the robotic device. Still further, the information may be considered to be received by a processor of the robotic device from a computing device that controls the robotic device. In some examples, the information may be considered to be received from a system such as a control system of the robotic device, a robotic gait system, a robotic step planning system, and/or a robotic vision system. Such systems may be part of the robotic device or may be part of another computing or robotic device.

As shown by block 410, the method 400 also includes receiving a set of constraints. In some examples, the set of constraints may set forth conditions of an optimization problem, equation, function, or set thereof. The set of constraints may include physical limitations of a robotic device or a robotic device's components. In some instances, the set of constraints may be described by equality and/or inequality equations. One example constraint may correspond to a length of an appendage of a robotic device. An appendage of the robotic device may have a maximum length that may be achieved. In one example, a constraint may prevent the robotic device from attempting to achieve a length with the appendage that is not physically supported. In another example, the robotic device may have a minimum length that the robot's appendage may accomplish without causing some sort of interference with the robotic device or one of the robot's components. In another example, a user and/or another computing device may have a predetermined preferred range of lengths that may prevent the robot's appendages from interfering with other components of the robotic device or of the robot's surroundings (e.g., terrain, environment).

For example, the length of the appendage of a robotic device may be constrained to a range that prevents a robotic device body from coming in contact with a surface or an obstacle. In another example, the length of the appendage of a robotic device may be constrained to a range that prevents the appendage itself from coming in contact with a surface or an obstacle. In yet another example, the length of the appendage of a robotic device may be constrained to a range that enables the robotic device body to stay balanced and not fall over while in motion.

In one example, where a hip joint is located at one end of the appendage, an end component is located at the other end of an appendage, where H is the distance between the hip joint and the end component and L is the physical length of the appendage, the appendage length constraint may be represented by:

$$H \le cL_{max}; H_{max} = \sqrt{L_{max}^2 - dX^2 - dY^2}; H_{max} \ge cL_{max}; c \approx 2/3$$

Another example constraint may correspond to the gravitational force experienced by the robotic device. In one example, this constraint corresponds to when a robotic device body is not in contact with any surface and the only force experienced by the robotic device is a gravitational force. The gravitational force constraint may be referred to as a flight constraint. In such an example, where x is the position in a lateral direction, y is a position in a forward position, z is a direction in a vertical direction, r is a position describing the pitch of the robotic device body, and g is the acceleration due to gravity, the gravitational force constraint may be represented by:

$$\frac{d^2Z}{dt^2} = -g; \frac{d^2X}{dt^2} = \frac{d^2Y}{dt^2} = \frac{d^2R}{dt^2} = 0$$

Another example constraint may correspond to a center of pressure constraint. In one example, the center of pressure constraint may require that a force experienced by an end component of the robotic device when the end component contacts a surface is going to be greater than or equal to zero. In another example, the center of pressure constraint may require that at least 10% of a weight of the robotic device be distributed to each appendage and corresponding end component of the robotic device. In yet another example, this constraint may require that the robotic device keep at least two end components on a surface at any one time. The center of pressure constraint may keep the center of pressure of the robotic device along a line of support that keeps the robotic device balanced and prevents the robotic device from falling over, for example. This constraint may also prevent an overloading of weight on any one single appendage or end component of the robotic device. In one example, the center of pressure constraint equally distributes the weight of the robotic device to each appendage and corresponding end component that is in contact with the surface.

Another example constraint may correspond to a position of a robotic device body ("the body") that constrains the acceleration of the body to a maximum and minimum value, thus representing a minimum acceleration and a maximum acceleration of the body.

In some instances, constraints on a robotic device may conflict with one another. In such a case, a priority of the constraints may be provided by a user or computing device. For example, if a minimum acceleration constraint and appendage length constraint conflict, the minimum acceleration takes priority.

As shown by block 412, the method 400 also includes receiving a predetermined height and a predetermined pitch of the body for the robotic device to maintain a balance. In at least one example, the predetermined height and pitch of the body may describe an ideal, desired, or preferred height and pitch of the robotic device body. The predetermined height and pitch may be determined by a computing device or may be inputted by a user. Further, the predetermined height and pitch may be based on maintaining the balance of the robotic device while the robotic device is moving along a reference step path, such as the path described in block 405 above. The robotic device may determine a new height and a new pitch for a given moment in time at least partly based on the predetermined height and pitch. In one embodiment, the robotic device may actuate appendages in an attempt to achieve the predetermined height and pitch, although the new height and new pitch may not equal the predetermined height and pitch because of some other consideration.

In some examples, the predetermined height and pitch of the body for the robotic device to maintain the balance may be considered the predetermined height and pitch that enables the robotic device to remain upright and/or steady while operating in a certain configuration or completing a certain task. In some embodiments, maintaining the balance may prevent the robotic device from falling over or may be based on achieving an even distribution of weight. In other embodiments, while the even distribution of weight may be preferred, variations from the even distribution may be allowed because of a specific configuration or other factor that may affect the weight distribution, such as the robotic device carrying an unbalanced load or carry a load up/down an uneven surface. In one embodiment, maintaining the balance may be understood as distributing forces across end components of the robotic device that are in contact with a surface such that the robotic device maintains a center of mass below the body. In another instance, maintaining the balance may be understood as counteracting or stabilizing the momentum of the robotic device to keep the robotic device moving along the reference step path.

The balance of the robotic device may depend on a number of factors such as a configuration of the robotic device, a load carried by the robotic device, a velocity of the robotic device, a task assigned to the robotic device, a topography of a terrain the robotic device is traversing, a reference step path, and/or a length of an appendage of the robotic device, among others. In one embodiment where the robotic device is not carrying any load, there may be a wide range of values for the predetermined height and pitch for the robotic device that would maintain the balance. In another embodiment, where a heavy load is applied to the robotic device, the predetermined height may be lower than without the heavy load in order to maintain the balance of the robotic device by lowering the center of mass of the robotic device and load combined. In yet another embodiment, if the heavy load is applied to the robotic device unevenly, for example if most of the load is distributed to a back end of the robotic device, the predetermined pitch of the body may be pitched less or be pitched down (i.e. with a front end lower than the back end), in order to compensate for the additional load on the back end, and thus helping to maintain the balance of the robotic device.

In even another embodiment, as the robotic device begins to climb over an uneven or sloped terrain, the predetermined height and pitch for the robotic device to maintain the balance may consider the distribution of the weight of the robotic device and/or any load in response to the terrain. For example, if the robotic device is moving along a terrain and encounters a hill that slopes up at about thirty-five degrees to the horizontal, the robotic device may have a predetermined pitch of thirty degrees for the robotic device to maintain the balance as the robotic device moves up the slope. However, if the robotic device is carrying a load up the same thirty-five degree slope, the predetermined pitch of the body for the robotic device to maintain the balance may be closer to fifteen degrees so that the load does not force the robotic device to fall backward down the slope. In other words, the body of the robotic device may be pitched less, or closer to horizontal, than the body would be without the load in order to prevent the robotic device from falling over. Similarly the predetermined height might be different to maintain the balance.

In other examples, when the robotic device is moving along a reference step path, not all of the end components may be in contact with a surface at a given moment in time. For example, a robotic device with four appendages and four end components may only have three end components in contact with a surface as the robotic device moves across a surface. With one end component off of the surface, the robotic device may distribute the weight of the robot and any load to the other three end components so that the robotic device does not fall over.

As shown by block 415, the method 400 also includes assigning a cost to one or more features of the trajectory vector that may be described as potential or selected outputs. A cost may be a value given to an output that expresses the importance or value that output has on achieving a desired trajectory for a robotic device as it moves. Further, a cost assigned to one output may be relative to the cost assigned to another output. Costs are assigned in order to accurately model the impact of selected outputs on a total cost to the system. In at least one example, by assigning a cost to selected outputs, desired behavior characteristics of a robotic device may be expressed by a linear quadratic function; this function may be known as a cost function. By expressing the desired behavior characteristics as the cost function, accurate modeling of desired output values may be achieved based on the assigned costs. A computing device may assign the costs in response to program instructions or commands that may be inputted by a user or other computing device. Such instructions or commands may express the cost value of each output based on the desired operations, tasks, procedures, or other undertakings that the robotic device may be assigned to complete. For example, an input may be a specific value for an ideal or desired height of the robotic device so that the robotic device can more smoothly climb a set of stairs. The cost assigned to an actual height of the robotic device may then be higher than the cost assigned to other outputs in order to express the importance of the robotic device reaching the desired height.

In some embodiments costs may be assigned to outputs that include a height of a body of a robotic device, a vertical acceleration of the body (also referred to as a "height acceleration of the body" or "height acceleration"), a pitch acceleration of the body (also referred to as "pitch acceleration"), a capture point, a center of pressure, a forward acceleration and a lateral acceleration. In one embodiment, a cost may be assigned to the height of the body above a surface. The cost to the height of the body may represent the value of maintaining or achieving a height of the body near an ideal or desired value (or range of values). The ideal or desired value may be the predetermined height value that is chosen or calculated by a user or a computing device based on a desired operation of the robotic device.

Similarly, a cost may be assigned to the height acceleration of the body and the pitch acceleration of the body. Costs assigned to the height and pitch acceleration may be valued based on reducing or minimizing such accelerations of the body in order to enable more controlled movement of the body. In some situations, for example if a high velocity profile for the body is desired, different costs may be assigned to the height and pitch acceleration such that the height and pitch acceleration may have a lower cost relative to other parameters and thus the height and pitch acceleration may be higher that it would be in other situations.

A cost may also be assigned to a center of pressure. The center of pressure may be a single point where a total sum of forces acts upon the robotic device. The single point may have a x-coordinate, a y-coordinate, and a z-coordinate that represent the forward, the lateral, and the height location of the single point where the force acts. In certain embodiments, the center of pressure may be based on a desired reference step path as described in block 405. Further, the center of pressure may assume a fixed weight distribution among each attached appendage and corresponding end component of the robotic device body.

A cost may also be assigned to a capture point. A capture point is a single point located on a surface and is based on a velocity of the body and a center of mass of the body. A capture point may be referred to as a dynamic center of mass. In at least one example, the single point on the surface has a x-coordinate and a y-coordinate. In certain embodiments the capture point may be based on a determination by another system such as a robotic step planner system or a robotic gait system. In another embodiment the capture point may be based on a desired reference step path as described in block 405.

Assigning costs, or in other words, giving weighted values to parameters, may be based a wide variety of factors. In one example, assigning costs may be based on achieving and/or maintaining a certain minimum height of the body. In another example, the balance of the robotic device may be of a higher importance than other parameters due to a uniquely unstable terrain that the robotic device must traverse. In such a case the center of pressure and the capture point, described above, may be given relatively higher cost assignments than other parameters.

In yet other examples, assigning costs may be based on a physical limit represented by a constraint, the importance of avoiding conflicts of two or more constraints within the set of constraints such as physical interferences with an environment, the importance of maintaining or avoiding a certain velocity or acceleration of the body, or the importance of avoiding obstacles that may interfere with movement of the body. So for example, a physical limit represented by a constraint may be a constraint that represents the length of a given appendage of a robotic device. For example if avoiding a situation in which the robotic device might come close to the physical limit of the length of the given appendage, that constraint may be assigned a higher value than it was assigned before. So in one example, if the robotic device attempts to raise the height of the body beyond what is physically possible based on the length of the appendage, possibly in order to achieve a greater pitch, for example, a higher cost may be assigned to the height of the body that gives greater importance to avoiding such a height. In another example, if the cost value assigned may consider the importance of a velocity of the body, such that the cost to the height acceleration of the body and the pitch acceleration of the body may increase as a velocity of the body increases.

Costs may be assigned based on values defined by a user, a task assigned to the robotic device, or a plan for operating the robotic device. Also, the cost values assigned may be proportional and/or relative to one another. So for example, if the costs are proportional, if one cost value to one parameter goes down, another may go up. If the costs are relative to one another, and the user decides that the height of the body is of 25 times greater importance than the pitch acceleration of the body, the height may be assigned a cost of 25.0 while the pitch acceleration would be assigned a cost of 1.0. In another example, the process of assigning a cost may include selecting one parameter out of a series of parameters as a reference parameter and set the reference parameter's cost to 1.0. The user or the computing device may then assign the other costs to the other parameters relative to the reference parameter's cost of 1.0.

In one embodiment, the height acceleration may be selected as the reference parameter and assigned a cost of 1.0. The computing device may decide that the pitch acceleration is equally important and assign a cost of 1.0 to the pitch acceleration. The computing device may determine that the height of the body needs to be corrected a certain amount, for example four centimeters. The computing device may decide that is worth a tradeoff of one meter per second squared in the pitch acceleration in order to correct the height by four centimeters. As such, the computing device may assign a cost of 25 to the height of the body. As noted, the computing device may be selecting, assigning, deciding, and altering the costs based on inputs from a user.

Assigning a cost may include selecting initial costs, operating the robotic device according to the costs assigned, and adjusting the costs as necessary to achieve a desired path of motion, trajectory, position, or pitch and height of the body. So for example, if the height is not as accurate to a predetermined height as a user might desire, the cost to the height may be increased. Or, for example, if the robotic device accelerates in pitch or height uncontrollably in order to correct for a height, the cost to the height may be lowered and/or the cost to the height and pitch accelerations may be increased.

In at least one embodiment, the cost function describes a total cost on the system in order to achieve controlled movement of the body from one position at one state in time to another position at another state in time. Controlled movement may depend on a task assigned to the robotic device or a plan for operation of the robotic device, but in at least one embodiment controlled movement may result in reducing a height acceleration and a pitch acceleration of the body. By reducing the height and pitch accelerations, the body may transition and traverse over widely varied terrains more easily and efficiently.

As shown by block 420, the method 400 also includes determining a new height and a new pitch for a robotic device body ("the body") that reduces a height acceleration and pitch acceleration of the body based on at least the reference step path described in block 405. In at least one illustration, the new height and new pitch of the body occur when an end component of the robotic device moves along the reference step path described in block 405.

The height and the pitch of the body may be components of a trajectory vector. The cost function, described above, may be written as a function of the trajectory vector. In one example implementation, determining a new height and a new pitch of the body includes optimizing the cost function that includes the trajectory vector by using quadratic programming. In at least one example, optimizing a cost function includes minimizing or reducing a total cost of the cost function. In another example, minimizing the cost may be subject to a set of constraints, such as the constraints described in block 410.

For example, optimization may include finding the x that minimizes y in the function y=f (x) where y is one-dimensional and x is a many dimensional vector. The optimization may be subject to inequality and/or equality constraints described above. Many different solvers exist and may vary in speed, representational capacity, requirements of convexity, numerical stability, the ability to handle stochastic functions, and requirements for the derivative of the function.

A linear system may be expressed as Ax=b, where A is a constant matrix, x is a position trajectory vector of free variables and b is a vector of constants and each row is a linear equation. In at least one embodiment, Ax=b may be considered an over-constrained system because the system may include more equations than can be satisfied simultaneously. Each row may be multiplied by the cost values assigned above to weight each equation by importance, as described in block 415. The position trajectory vector may include the height of the body and the pitch of the body as free variables that are directly optimized and solved for by the quadratic programming. The height and the pitch of the body in the trajectory vector represent the height and the pitch at a specific time in the future. The optimizing includes minimizing a cost function where the cost function is written in terms of the position trajectory vector. The cost function may be expressed by the equation:

$$C(x) = \tfrac{1}{2} x^T Q x + q_0 x,$$

subject to $Gx \leq k$ and $Ex=d$ where $Q = A^T A$ and $q_0 = -b^T A$.

Q and $q_0$ are constructed from the linear equation Ax=b as described above. The optimization determines how to solve the trajectory vector including the free variables as close as possible with as little error as possible. The free variables, solved by the optimization of the cost function above, may include the height and the pitch of the body. The computing device may determine the new height and new pitch from the optimized cost function. The height and the pitch solved for by the quadratic programming may then be used to compute a hip height, accelerations, and a velocity. A capture point may be computed from a horizontal position and velocity. A center of pressure may be calculated from the computed accelerations using inverse dynamics. These computations are described below.

In one embodiment, utilizing a small angle approximation for trigonometric simplification, the height and the pitch may be computed from the free variables expressed in the equation $Height_{hip} = Z \pm L*R$, where Z is the body height, R is the body pitch, and L is one half a length of the body (or the distance from a center of mass of the body to a hip). In that equation, the height and the pitch are the free variables outputted from the optimized cost function and the length of the body is a constant inputted by the computing device or user.

The velocity may be computed numerically from the equation $$V_i = \frac{P_i - P_{i-1}}{T_i}.$$

The accelerations may be computed numerically from the equation:

$$A_i = \frac{2T_i P_{i+1} - 2P_i(T_i + T_{i+1}) + 2T_{i+1} P_{i-1}}{T_i T_{i+1}(T_i + T_{i+1})},$$

which may be simplified to $$A_i = \frac{P_{i+1} - 2P_i + P_{i-1}}{T^2} \text{ if } T = T_i = T_{i+1}.$$

The capture point may be computed from the position trajectory vector, including the horizontal position and velocity, as expressed by $C_x = X + \omega \dot{X}$; $\omega = \sqrt{h/g}$.

The center of pressure may be computed from the computed accelerations using inverse dynamics expressed in the equation $$P_x = X - \frac{\frac{I}{m}\ddot{\theta} + h\ddot{X}}{g + \ddot{Z}}.$$

The costs, assigned in block 415 described above, may be based on the difference between the values computed by the equations above and predetermined input, or desired, values.

So for example, the determining the new height and new pitch that reduce the height acceleration and the pitch acceleration of the body when the end component moves along the reference step path, may include a computing device optimizing the cost function and solving for the free variables in a trajectory vector. In one instance, determining the new height and the new pitch may be iterated for each time increment based on the inputs from a user and the outputs from a previous time increment. In one embodiment, the quadratic programming that optimizes the cost function above may include a Model Predictive Controller (MPC) or Receding Horizon Control (RHC) in order to re-optimize the equation for each time increment, thus iterating the position trajectory vector for each time increment.

In order to determine the new height and new pitch that reduce the height acceleration and the pitch acceleration of the body when the end component moves or steps along the reference step path, a computing device may base the determination on the reference step path received in block 405, the set of constraints received in block 410, the predetermined height and pitch received in block 412, and the costs assigned to input parameters in block 415. By determining an appropriate height and pitch of the robotic device body that reduce the height and pitch acceleration the for each time increment, the robotic device may move more smoothly and efficiently over various terrains. In some embodiments, by altering the costs assigned in block 415 and determining a new height and new pitch based on a re-optimization of the cost function with the altered costs, smoother movement and transition between robotic device positions, including the height and the pitch, may be controlled. Again, this process may be iterated over multiple time increments to control the position of the body over a period of time.

In another embodiment, the method 400 may similarly include determining a new forward position and a new lateral position of the body that reduces the height acceleration and the pitch acceleration of the body based on at least the reference step path described in block 405. Determining the new forward position and the new lateral position may be further based on the set of constraints, the predetermined height and the predetermined pitch of the body and the cost assigned to each of the height of the body, the height acceleration of the body, the pitch acceleration of the body, the center of pressure, the capture point, the forward acceleration of the body, and the lateral acceleration of the body.

As shown by block 425, the method 400 also includes instructing the robotic device to actuate an appendage(s) to achieve the determined new height and new pitch when an end component moves along the reference step path. In certain examples, the appendages may actuate to lift the body to a new height that is higher than a previous height, while in certain examples the appendages may actuate to lower the body to a new height that is lower than a previous height. Similarly, the robotic device body may be more or less pitched in a direction when it achieves the new pitch. In some examples, the new height and pitch may correspond to the robotic device going up or down a slope, or going up or down stairs, or going over, around or under other of any number of obstacles.

IV. EMBODIMENT IMPLEMENTATION EXAMPLE: ROBOTIC DEVICE CLIMBING AN OBSTACLE

FIGS. 5A-5E present an example environment with a robotic device 500 that encounters an obstacle that is shown as a staircase. Robotic device 500 includes a robotic device body 505 ("the body 505"), four appendages 510, and four end components 515. Also depicted in FIGS. 5A-5E are reference step path 520, a capture point 525, and a height 530 of the body 505. FIGS. 5B-5E also include a pitch 535 of the body 505. Robotic device 500 may be a physical representation of the robotic device 100 shown in FIG. 1. Robotic device 500 is similar to and may include components of the robotic device 200 in FIG. 2 or robotic device 300 in FIG. 3, and may be configured to implement the method 400 in FIG. 4. For example, robotic device body 505 may correspond to robotic device body 210, appendages 510 may correspond to appendage(s) 215, and end components 515 may correspond to end component(s) 220. Furthermore, robotic device 500 and components may be based on other configurations.

The reference step path 520 may be a representation of the reference step path described in block 405 of FIG. 4. The reference step path 520 may include a plurality of spatial points, where each spatial point defines a predetermined step location for the end component 515 of the robotic device 500. Each predetermined step location may include an x-coordinate, a y-coordinate, and a z-coordinate. In some instances, the reference step path 520 may represent one or more of the planned step locations for the end components 515 to make contact with the surface while the robotic device 500 is walking, trotting, jogging, running, or executing some other type of movement. In some instances, there may be one or more reference step paths 520.

Figure 5A:
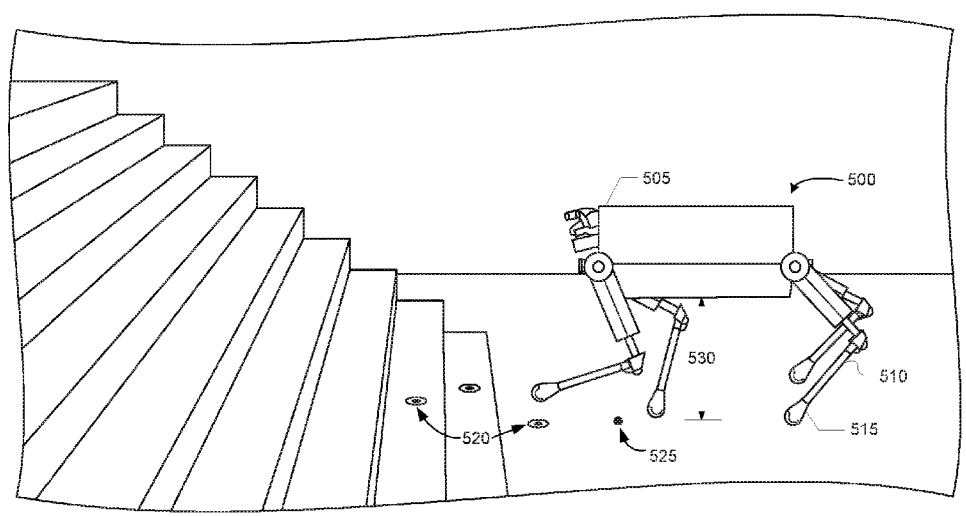
FIG. 5A illustrates a robotic device approaching a staircase, according to an example implementation.

FIG. 5A also illustrates capture point 525 as a point on a surface under the body 505. The capture point 525 is based on a velocity of the body 505 and a center of mass of the body 505 and may serve as an input to a computing device, for example. The capture point 525 may also be based on a translational or horizontal position of the robotic device body. The capture point may be dependent on the velocity of the robotic device 500 such that if the robotic device 500 was moving at a high velocity in a forward direction, the capture point would be located farther in the forward direction than if the robotic device 500 was moving at a lower velocity. In some embodiments, the capture point may be described as a dynamic center of mass of the robotic device 500.

The height 530 of the body 505 is also illustrated in FIGS. 5A-5E and may represent the height of the body 505 of the robotic device 500 above a surface. In some embodiments, the height may be measured as the distance between a surface and a connection point of the appendages 510 to the body 505 (a hip joint). In yet other embodiments, the height may be measured as the distance between the end components 515 when the end components are in contact with the surface and the connection point of the appendages 510 to the body 505 (the hip joint).

Furthermore, in even other embodiments, there may be one or more heights measured. For example, there may be a front hip joint height that represents the distance from a front hip joint (such as front hip joint 225a in FIG. 2) to a surface or end component 535 and a hind hip joint that represents the distance from a hind hip joint (such as hind hip joint 225b in FIG. 2) to a surface or end component 535. In some instances there may be a predetermined height of the body 505 above a surface. The predetermined height may represent a desired or ideal height based on the tasks assigned to the robotic device 500 and the type of motion the robotic device 500 is required to execute, for example. Similar to a predetermined height of the body 505 above the surface, there may be a predetermined front hip joint height and a predetermined hind hip joint height. The height 530 of the body 505 may be measured and/or monitored by sensor(s) (such as sensor(s) 145 in FIG. 1) and may be controlled by a control system (such as control system 125 in FIG. 1) or a computing device.

The pitch 535 of the body 505 is also illustrated in FIGS. 5B-5E. In some implementations, the pitch 535 may be the angle of a centerline, topline, or bottomline of the body 505 in relation to a horizontal horizon. In other implementations, the pitch 535 may be a relative height difference between a front of the body 505 and a back of the body 505. In another example, the pitch 535 may be determined from a relative difference between a front hip joint height and a hind hip joint height. In some examples, the pitch 535 may be determined by a computing device to match a slope of a surface below the robotic device body 505. In some instances there may be a predetermined pitch of the body 505 that corresponds to a desired or ideal pitch. The predetermined pitch of the body 505 may depend on factors such as a velocity, a gait (e.g., walking, trotting, running) and the movement the robotic device 500 is executing. The predetermined pitch may have been predetermined by a user or by a computing device. For example, it may be predetermined that the pitch 535 should be 30 degrees up in the front when moving at a specific velocity. The pitch 535 of the body 505 may be measured and/or monitored by sensor(s) (such as sensor(s) 145 in FIG. 1) and may be controlled by a control system (such as control system 125 in FIG. 1) or a computing device.

FIG. 5A illustrates robotic device 500 approaching an obstacle (in this instance, represented as a staircase, but could be any number of obstacles) that is a distance in front of it. In FIG. 5A the reference step path 520 begins to lead up the steps as the robotic device 500 approaches the staircase, but at least one of the predetermined step locations remain on a ground surface. In FIG. 5A, the robotic device 500 is not close enough in proximity to the staircase obstacle to require adjustment of the height 530 of the body 505. Also, the body 505 is not pitched (or pitched very little due to walking variations) when the robotic device 500 is traversing a flat surface in this example. In some embodiments, it may have been determined that a new height and a new pitch are not necessary at the point in time represented in FIG. 5A to achieve accurate control and smooth motion based on the location of the reference step path 520, the capture point 525, and/or any number of other input parameters.

Figure 5B:
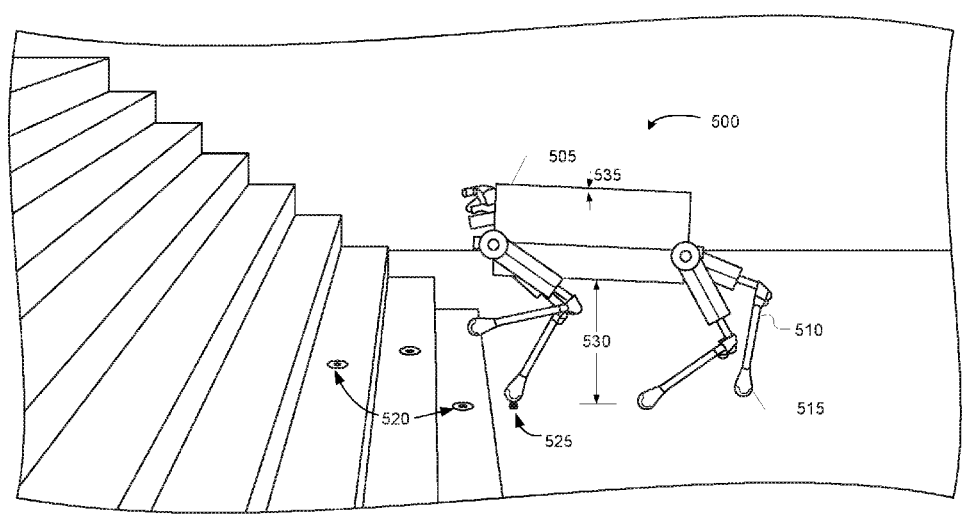
FIG. 5B illustrates a robotic device about to climb a staircase, according to an example implementation.

FIG. 5B illustrates the robotic device 500 about to step one of the end components 515 onto a first step of the staircase. At the point in time represented in FIG. 5B all, almost all, or at the least more than in FIG. 5A, of the reference step path 520 is located on steps such that each predetermined step location (or spatial point) is located up the staircase higher than the prior step location. Despite the reference step path 520 completely on the stairs, the robotic device has not yet began to climb the stairs. At this point in time, based on at least the position of the reference step path 520, appendage(s) 510 may have actuated to raise the position of at least a portion (such as the front) of body 505 in preparation for when the end effectors 515 reach the predetermined step locations and begin contacting a surface of the staircase. The height 530 of the body 505 may increase and additionally the pitch 535 of the body 505 may increase to at least a small angle. By increasing the height 530 of the body 505 and the pitch 535 of the body 505, robotic device 500 may achieve smoother motion, minimal or reduced height and/or pitch of the body accelerations, improved balance and/or more control if robotic device 500 begins to climb on the staircase. The improved balance or control may come from determining the new height and new pitch after optimizing the cost function and then solving for variables in a trajectory vector as described in blocks 415 and 420 of FIG. 4 above. Optimizing the cost function may include adjusting the costs assigned to the parameters in order to achieve the predetermined height and pitch of the body that maintains the robotic device's balance, or in other words a desired output height and pitch. Furthermore, in some instances, robotic device 500 may avoid any conflicts or interferences between the body 505, the appendages 510 or the end components 515 by making the adjustments described to the height 530 of the body 505 and the pitch 535 of the body 505.

Figure 5C:
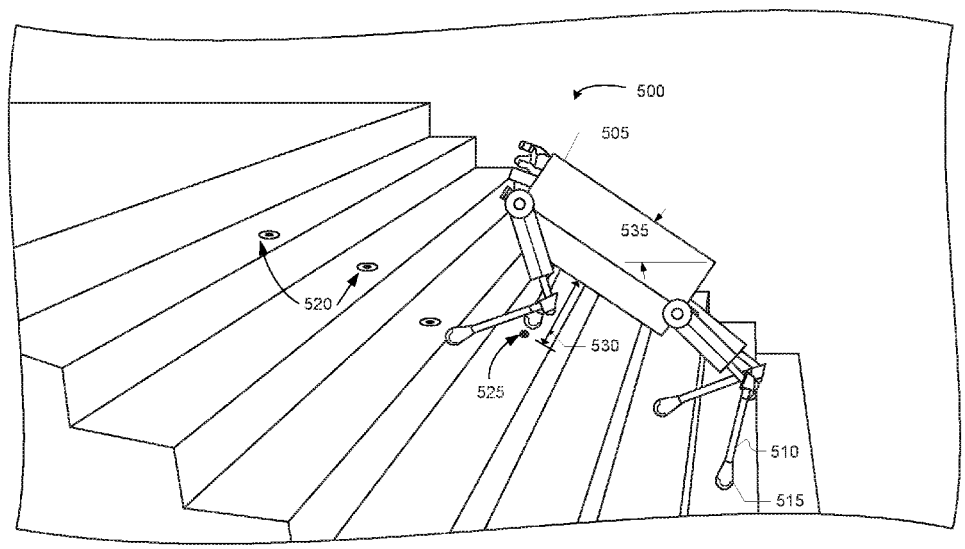
FIG. 5C illustrates a robotic device climbing a staircase, according to an example implementation.

FIG. 5C illustrates the robotic device 500 midway up the staircase. At the point in time represented in FIG. 5C, the reference step path 520 provides spatial points on the steps of the staircase. Additionally, and unlike in FIG. 5B, the capture point 525 is also located on the staircase. At least based on the reference step path 520 located on the steps of the staircase, robotic device 500 may have actuated the appendages 510 and corresponding end components 515 in order to achieve a height 530 of the body 505 and/or a pitch 535 of the body 505 that enables smooth motion, minimal or reduced height and/or pitch accelerations of the body 505, better balance and/or control. The height 530 and/or the pitch 535 achieved may be equal or nearly equal to the predetermined height and predetermined pitch of the body. The height 530 and/or the pitch 535 may have increased or decreased in order to prevent the body 505, the appendages 510, and/or the end components 515 from conflicting or interfering with the staircase. For example, if the height 530 and/or pitch 535 did not adjust based on the reference step path, the movement of the robotic device 500 up the staircase may cause the appendages 510 to improperly contact a step which in turn may prevent the end components 515 from moving, stepping to or being able to reach the predetermined step location. In the instance illustrated in FIG. 5C, the pitch 535 of the body 505 has increased in comparison to the pitch 535 in FIG. 5B.

Figure 5D:
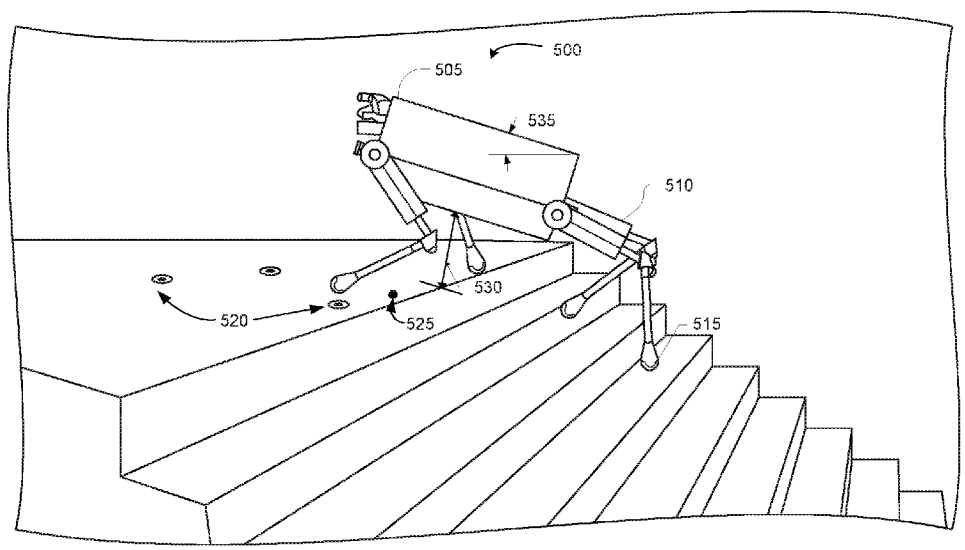
FIG. 5D illustrates a robotic device reaching a level landing of a staircase, according to an example implementation.

FIG. 5D illustrates the robotic device 500 transitioning from the steps of the staircase to a level landing at a top of the staircase. At the instance illustrated in FIG. 5D, most of the reference step path 520 is defined by spatial points on the level landing. As such, at least based on the reference step path 520, the robotic device 500 may have actuated the appendages 510 and corresponding end components 515 in order to achieve a height 530 of the body 505 and/or a pitch 535 of the body 505 that enable smooth motion, minimal or reduced height and/or pitch accelerations, better balance and/or control. With the robotic device 500 at the top of the staircase, the height 530 may increase while the pitch 535 might decrease, for example. In one embodiment, to facilitate smooth motion and prevent any conflicts, the front hip joint above the surface might decrease while the hind hip joint height above the surface might increase resulting in the pitch 535 to decrease and become more level when the robotic device 500 approaches the level landing.

Figure 5E:
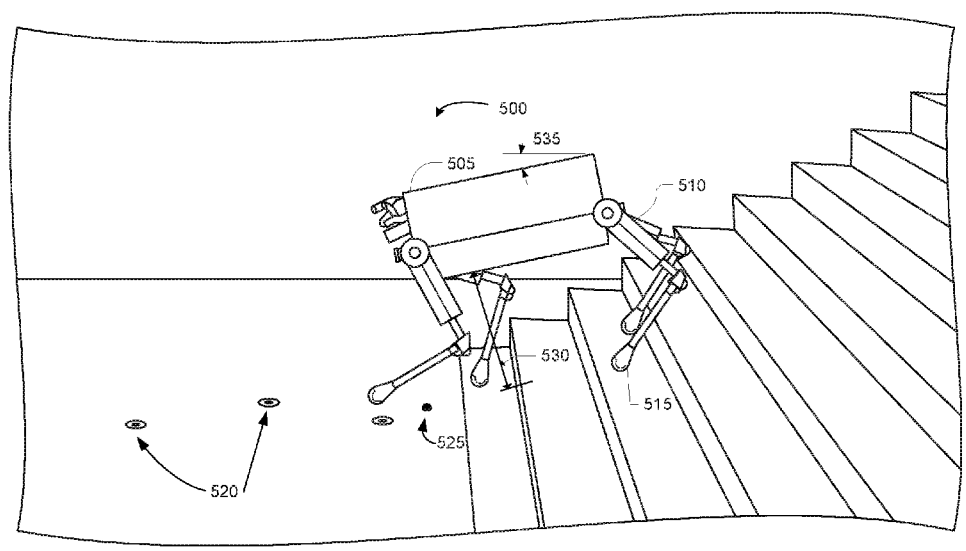
FIG. 5E illustrates a robotic device stepping off a staircase on to a level ground surface, according to an example implementation.

Similar to FIG. 5D, FIG. 5E illustrates the robotic device 500 transitioning from the steps of the staircase to a level ground surface. In FIG. 5E, each of the predetermined step locations of the reference step path 520 are located on the level ground surface. Based on the reference step path 520, the robotic device 500 may have actuated the appendages 510 and corresponding end components 515 in order to achieve a position of the body 505 above the surface that enables smooth motion, minimal or reduced height and/or pitch accelerations of the body 505, better balance and/or control. The position may include a height 530 of the body 505 above the surface and/or a pitch 535 of the body 505 above the surface. The position may be a first of a series of different positions, each corresponding to a time increment, and when taken together the series of different positions may constitute a position trajectory for the robotic device body 505.

V. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method comprising:
   receiving, by a computing device, a reference step path that comprises a plurality of spatial points that each define a predetermined step location for an end component of a robotic device, wherein the robotic device has a plurality of appendages and the plurality of appendages are connected to a body of the robotic device, wherein the end component is connected to a distal end of a given appendage of the plurality of appendages;
   receiving, by the computing device, a set of constraints comprising a length of the given appendage and a gravitational force experienced by the body of the robotic device;
   receiving, by the computing device, a predetermined height and a predetermined pitch of the body for the robotic device to maintain a balance;
   assigning, by the computing device, a cost to each of a height of the body, a height acceleration of the body, and a pitch acceleration of the body;
   determining, by the computing device, a new height and a new pitch of the body that reduces the height acceleration and the pitch acceleration of the body when the end component moves along the reference step path, based on i) the reference step path, ii) the set of constraints, iii) the predetermined height and the predetermined pitch of the body and iv) the cost to each of the height of the body, the height acceleration of the body, and the pitch acceleration of the body; and
   instructing the robotic device to actuate the plurality of appendages to achieve the new height and the new pitch of the body when the end component moves along the reference step path.

2. The method of claim 1, further comprising:
   assigning, by the computing device, a cost to each of a center of pressure that indicates an amount of force on the end component, a capture point that indicates a position on the surface based on a velocity of the body and a center of mass of the body, a forward acceleration of the body, and a lateral acceleration of the body;
   determining, by the computing device, a new forward position and a new lateral position of the robotic device that reduces the height acceleration and the pitch acceleration of the body when the end component moves along the reference step path, based on i) the reference step path, ii) the set of constraints, iii) the predetermined height and the predetermined pitch of the body and iv) the cost to each of the height of the body, the height acceleration of the body, the pitch acceleration of the body, the center of pressure, the capture point, the forward acceleration of the body, and the lateral acceleration of the body; and instructing the robotic device to actuate the plurality of appendages to achieve the new forward position and new lateral position when the end component moves along the reference step path.

3. The method of claim 1, wherein the set of constraints further comprises a center of pressure constraint that requires a force put on the end component to be greater than or equal to zero.

4. The method of claim 1, further comprising:

assigning, by the computing device, a cost to each of a front hip joint height and a hind hip joint height, wherein each hip joint is defined as a connection point between a given appendage and the body of the robotic device; and determining, by the computing device, a new height and a new pitch of the body that reduces the height acceleration and the pitch acceleration of the body when the end component moves along the reference step path, based on i) the reference step path, ii) the set of constraints, iii) the predetermined height and the predetermined pitch of the body and iv) the cost to each of the front hip joint height, the hind hip joint height, the height acceleration of the body, and the pitch acceleration of the body.

5. The method of claim 1, further comprising:

determining, by the computing device, a plurality of hip joint heights that reduce the height acceleration and the pitch acceleration of the body when the end component moves along the reference step path, based on i) the reference step path, ii) the set of constraints, iii) the predetermined height and the predetermined pitch of the body and iv) the cost to each of the height of the body, the height acceleration of the body, and the pitch acceleration of the body, wherein each given hip joint height is defined as a height of a connection point between a given appendage and the body of the robotic device; and instructing the robotic device to actuate the plurality of appendages to achieve the plurality of hip joint heights when the end component moves along the reference step path.

6. The method of claim 1, further comprising:

receiving, by the computing device, a x-coordinate and a y-coordinate of the predetermined step location of the end component from a robotic gait system that determines the reference step path; and receiving, by the computing device, a z-coordinate of the predetermined step location of the end component from a robotic vision system that comprises a processor and a camera feed from a field of view of the robotic device.

7. The method of claim 1, further comprising:

assigning a value of the cost based on avoiding a physical limit of the set of constraints and preventing two or more constraints within the set of constraints from conflicting while reducing the height acceleration and the pitch acceleration.

8. The method of claim 1, further comprising:

assigning a value of the cost based on a difference between the predetermined height of the body and the new height of the body.

9. A non-transitory computer readable medium having stored thereon instructions that, upon execution by a computing device, cause the computing device to perform functions comprising:

receiving a reference step path that comprises a plurality of spatial points that each define a predetermined step location for an end component of a robotic device, wherein the robotic device has a plurality of appendages and the plurality of appendages are connected to a body of the robotic device, wherein the end component is connected to a distal end of a given appendage of the plurality of appendages;

receiving a set of constraints comprising a length of the given appendage and a gravitational force experienced by the body of the robotic device;

receiving a predetermined height and a predetermined pitch of the body for the robotic device to maintain a balance;

assigning a cost to each of a height of the body, a height acceleration of the body, and a pitch acceleration of the body;

determining a new height and a new pitch of the body that reduces the height acceleration and the pitch acceleration of the body when the end component moves along the reference step path, based on i) the reference step path, ii) the set of constraints, iii) the predetermined height and the predetermined pitch of the body and iv) the cost to each of the height of the body, the height acceleration of the body, and the pitch acceleration of the body; and instructing the robotic device to actuate the plurality of appendages to achieve the new height and the new pitch of the body when the end component moves along the reference step path.

10. The non-transitory computer readable medium of claim 9, the functions performed further comprising:

assigning a cost to each of a center of pressure that indicates an amount of force on the end component, a capture point that indicates a position on the surface based on a velocity of the body and a center of mass of the body, a forward acceleration of the body, and a lateral acceleration of the body;

determining a new forward position and a new lateral position of the robotic device that reduces the height acceleration and the pitch acceleration of the body when the end component moves along the reference step path, based on i) the reference step path, ii) the set of constraints, iii) the predetermined height and the predetermined pitch of the body and iv) the cost to each of the height of the body, the height acceleration of the body, the pitch acceleration of the body, the center of pressure, the capture point, the forward acceleration of the body, and the lateral acceleration of the body; and instructing the robotic device to actuate the plurality of appendages to achieve the new forward position and new lateral position when the end component moves along the reference step path.

11. The non-transitory computer readable medium of claim 9, wherein the set of constraints further comprises a center of pressure constraint that requires a force put on the end component to be greater than or equal to zero.

12. The non-transitory computer readable medium of claim 9, the functions performed further comprising:

assigning a cost to each of a front hip joint height and a hind hip joint height, wherein each hip joint is defined as a connection point between a given appendage and the body of the robotic device; and determining a new height and a new pitch of the body that reduces the height acceleration and the pitch acceleration of the body when the end component moves along the reference step path, based on i) the reference step path, ii) the set of constraints, iii) the predetermined height and the predetermined pitch of the body and iv) the cost to each of the front hip joint height, the hind hip joint height, the height acceleration of the body, and the pitch acceleration of the body.

13. The non-transitory computer readable medium of claim 9, the functions performed further comprising:

determining, by the computing device, a plurality of hip joint heights that reduce the height acceleration and the pitch acceleration of the body when the end component moves along the reference step path, based on i) the reference step path, ii) the set of constraints, iii) the predetermined height and the predetermined pitch of the body and iv) the cost to each of the height of the body, the height acceleration of the body, and the pitch acceleration of the body, wherein each given hip joint height is defined as a height of a connection point between a given appendage and the body of the robot; and instructing the robot to actuate the plurality of appendages to achieve the plurality of hip joint heights when the end component moves along the reference step path.

14. The non-transitory computer readable medium of claim 9, the functions performed further comprising:

assigning a value of the cost based on avoiding a physical limit of the set of constraints and preventing two or more constraints within the set of constraints from conflicting while reducing the height acceleration and the pitch acceleration.

15. The non-transitory computer readable medium of claim 9, the functions performed further comprising:

assigning a value of the cost based on a difference between the height of the body and the new height trajectory of the body.

16. A robotic device comprising:

a body;

a plurality of appendages that are connected to the body of the robotic device;

a plurality of end components, and each respective end component is connected to a respective distal end of a respective appendage of the plurality of appendages;

a processor; and a non-transitory computer readable medium having stored thereon instructions that, when executed by the processor, cause the robotic device to perform functions comprising:

receiving a reference step path that comprises a plurality of spatial points that define a predetermined location for the given end component of the robotic device;

receiving a set of constraints comprising a length of the given appendage and a gravitational force experienced by the body of the robotic device;

receiving a predetermined height and a predetermined pitch of the body for the robotic device to maintain a balance;

assigning a cost to each of a height of the body, a height acceleration of the body, and a pitch acceleration of the body;

determining a new height trajectory and a new pitch trajectory of the body that reduces the height acceleration and the pitch acceleration of the body when the end component moves along the reference step path, based on i) the reference step path, ii) the set of constraints, iii) the predetermined height and the predetermined pitch of the body and iv) the cost to each of the height of the body, the height acceleration of the body, and the pitch acceleration of the body; and instructing the robotic device to actuate the plurality of appendages to achieve the new height and the new pitch of the body when the end component moves along the reference step path.

17. The robotic device of claim 16, the functions performed further comprising:

assigning a cost to each of a center of pressure that indicates an amount of force on the end component, a capture point that indicates a position on the surface based on a velocity of the body and a center of mass of the body, a forward acceleration of the body, and a lateral acceleration of the body;

determining a new forward position and a new lateral position of the robotic device that reduces the height acceleration and the pitch acceleration of the body when the end component moves along the reference step path, based on i) the reference step path, ii) the set of constraints, iii) the predetermined height and the predetermined pitch of the body and iv) the cost to each of the height of the body, the height acceleration of the body, the pitch acceleration of the body, the center of pressure, the capture point, the forward acceleration of the body, and the lateral acceleration of the body; and transmitting the new height trajectory and the new pitch trajectory so the robotic device can actuate the plurality of appendages to achieve the new forward position and new lateral position when the end component moves along the reference step path.

18. The robotic device of claim 16, wherein the set of constraints further comprises a center of pressure constraint that requires a force put on each respective end component to be greater than or equal to zero.

19. The robotic device of claim 16, the functions performed further comprising:

receiving a x-coordinate and a y-coordinate of the predetermined step location of the end component from a robotic gait system that determines the reference step path; and receiving a z-coordinate of the predetermined location of the end component from a robotic vision system that comprises a processor and a camera feed from a field of view of the robotic device.

20. The robotic device of claim 16, the functions performed further comprising:

assigning a value of the cost based on avoiding a physical limit of the set of constraints and preventing two or more constraints within the set of constraints from conflicting while reducing the height acceleration and the pitch acceleration.

* * * * *